United States Patent
Idjadi

(10) Patent No.: US 12,547,042 B2
(45) Date of Patent: Feb. 10, 2026

(54) INTEGRABLE LASER FREQUENCY STABILIZATION USING MACH-ZEHNDER INTERFEROMETER

(71) Applicant: Nokia Solutions and Networks Oy, Espoo (FI)

(72) Inventor: Mohamad Hossein Idjadi, Chatham, NJ (US)

(*) Notice: Subject to any disclaimer, the term of this patent is extended or adjusted under 35 U.S.C. 154(b) by 328 days.

(21) Appl. No.: 18/128,528

(22) Filed: Mar. 30, 2023

(65) Prior Publication Data

US 2024/0329488 A1  Oct. 3, 2024

(51) Int. Cl.
  *G02F 1/21* (2006.01)
  *G02F 1/01* (2006.01)
  *G02F 1/225* (2006.01)

(52) U.S. Cl.
  CPC ............ *G02F 1/212* (2021.01); *G02F 1/0147* (2013.01); *G02F 1/225* (2013.01); *G02F 2201/58* (2013.01); *G02F 2203/15* (2013.01)

(58) Field of Classification Search
  CPC ....... G02F 1/212; G02F 1/225; G02F 2201/58
  See application file for complete search history.

(56) References Cited

U.S. PATENT DOCUMENTS

| | | | |
|---|---|---|---|
| 7,630,417 B1 | 12/2009 | Maleki et al. | |
| 12,261,413 B2 * | 3/2025 | Heim | H01S 5/5036 |
| 2005/0123306 A1 | 6/2005 | Ilchenko et al. | |
| 2006/0159135 A1 | 7/2006 | Cliche et al. | |
| 2011/0103415 A1 | 5/2011 | Rasras | |
| 2019/0229494 A1 | 7/2019 | Idjadi et al. | |

OTHER PUBLICATIONS

F. Aflatouni, et al. "Wideband tunable laser phase noise reduction using single sideband modulation in an electro-optical feed-forward scheme," OpticsLetters vol. 37, No. 2, pp. 196-198, 2012.
W. Bogaerts, et al., "Programmable photonic circuits," Nature, vol. 586, No. 7828, pp. 207-216, 2020.
R.W.P. Drever et al., "Laser phase and frequency stabilization using an optical resonator", Appl. Phys. B 31, No. 2 (1983) 97-105.
M.H. Idjadi, et al., "Integrated Pound-Drever-Hall laser stabilization system in silicon," Nat. Commun., vol. 8, No. 1, pp. 1-9, 2017.
M.H. Idjadi et al., "Nanophotonic phase noise filter in silicon," Nature Photonics Letters 14 (Apr. 2020) 234-239.
H. Shen, et al., "Systematic and quantitative analysis of residual amplitude modulation in Pound-Drever-Hall frequency stabilization," Phys. Rev. A, vol. 92, No. 6, pp. 063809, 2015.

(Continued)

*Primary Examiner* — Joseph L Williams
(74) *Attorney, Agent, or Firm* — Capitol Patent & Trademark Law Firm, PLLC

(57) ABSTRACT

An apparatus is provided, in which a feedback loop for tuning a tunable laser includes a Mach-Zehnder interferometer (MZI), a photodetector optically coupled to an optical output of the MZI, and an electrical feedback control circuit connected to receive electrical output signals from the photodetector and configured to frequency-adjust the tunable laser based on the received electrical output signals. One arm of the MZI includes an optical resonator to provide a frequency reference for tuning.

20 Claims, 8 Drawing Sheets

(56) References Cited

OTHER PUBLICATIONS

X. Shi, et al., "Suppression of residual amplitude modulation effects in Pound-Drever-Hall locking," Appl. Phys. B, vol. 124, No. 8, pp. 1-7, 2018.
W. V. Sorin, et al., "Frequency domain analysis of an optical FM discriminator," J. Light Technol., vol. 10, No. 6, pp. 787-793, 1992.
Xiaobo Xie et al., "Ring-Assisted Frequency Discriminator With Improved Linearity," IEEE Photonics Technology Letters 14, No. 8 (Aug. 2002) 1136-1138.

* cited by examiner

INTEGRABLE LASER FREQUENCY STABILIZATION USING MACH-ZEHNDER INTERFEROMETER

TECHNICAL FIELD

This disclosure relates to frequency stabilization of tunable, narrow-bandwidth lasers.

Art Background

Coherent stable lasers with narrow spectral linewidth have numerous applications in science and technology, including light detection and ranging (LiDAR), spectroscopy, and coherent optical communication. The main source of laser frequency instability is the thermal fluctuation and spontaneous emission within the laser cavity. Although improvements in the stability and quality factor of laser cavities can reduce frequency noise fluctuations to some extent, more complex solutions are required to achieve the very low noise levels that may be crucial for the applications mentioned above.

Optical frequency discriminators have been used to suppress these random fluctuations. A frequency discriminator is a device that measures fluctuations in the frequency domain and converts them to time-varying amplitudes in the electrical domain. The frequency discriminator uses an optical frequency reference to measure frequency fluctuations relative to the reference, and in response, it generates a difference signal. The difference signal is asymmetric around the frequency reference point, so that it takes, e.g., positive values when the laser frequency is greater than the reference frequency, and negative values when the laser frequency is less than the reference frequency.

In some applications of a frequency discriminator for stabilizing the output frequency of a laser, there is a feedback loop from the frequency-discriminator output to the input port of the laser for tuning control. The difference signal provides the error signal that is fed back to the laser. Because the error signal is asymmetric around the frequency reference point, the feedback control loop will be able to pull the laser frequency down toward the reference frequency from an output frequency that is above reference, and it will be able to push the output frequency up toward the reference frequency from an output frequency that is below reference. The error signal is generated and processed in the electrical domain in response to the frequency discriminator output. The feedback control to the laser cavity can, beneficially, suppress its noise. A frequency discriminator for measurement and/or suppression of noise is sometimes referred to as a "frequency noise discriminator (FND)."

Miniaturization of FNDs would be beneficial in the field of integrated photonics, not least because consumption of chip area could be reduced. Further, because miniaturization would reduce gradients across the devices due to environmental factors such as temperature, sensitivity to environmental fluctuations could also be reduced.

Currently, FND architectures face a tradeoff among noise-measurement sensitivity, device complexity and power consumption, area consumption on the photonic integrated chip (PIC), and level of undesired residual noise. For example, a more complex frequency noise discriminator architecture with active components (e.g. phase modulators) can potentially measure smaller laser frequency noise (higher sensitivity), but only at the cost of higher power consumption by the electronics required for processing the error signal, greater photonic chip area, and residual amplitude noise.

An architecture for laser frequency locking with a FND was proposed in R. W. P. Drever et al., "Laser phase and frequency stabilization using an optical resonator," *Appl. Phys. B*, vol. 31, no. 2, (1983) 97-105. That architecture used a Fabry-Perot cavity in a Pound-Drever-Hall (PDH) control loop, with an active component for fast optical phase modulation. Although promising results were obtained, the phase modulation caused residual amplitude noise that could degrade the laser noise performance.

Thus, there is a need for new approaches to laser stabilization that achieve more favorable tradeoffs among factors such as sensitivity, complexity, power consumption, chip area, and residual noise.

SUMMARY OF THE INVENTION

Disclosed here is a new electro-optic feedback loop for laser stabilization. The feedback loop, which is suitable for integration, utilizes a non-modulated optical frequency noise discriminator (FND) constituted by a Mach-Zehnder interferometer (MZI) with a passive optical resonator in one arm to serve as a frequency reference.

In one design variation for the FND, which we refer to as a "cavity coupled MZI", an optical ring resonator coupled to one arm of the MZI provides a frequency reference. In alternative design variations, a different type of optical resonator, such as a Fabry-Perot interferometer or an etalon, may serve as the frequency reference. In some design variations, an optical delay line may be included together with the optical resonator in one arm of the MZI. With adjustment of the relative phase delay between the two arms of the MZI, the delay line can provide coarse tuning of the FND, while the optical resonator provides fine tuning. The relative phase delay between the two MZI arms can be effectuated, for example, with a slow phase shifter such as a thermal phase shifter.

The output of the MZI will typically be photodetected with a differential photodetector using, e.g., balanced photodiodes, so that a null output signal can be obtained when the laser is precisely tuned to the reference frequency. The electrical output from the photodetector will typically be fed into a transimpedance amplifier to produce an error signal, which is then filtered and fed back into the laser cavity as a driver voltage or driver current for tuning the cavity.

We found that our passive FND can provide useful error signals for laser stabilization, with a simpler photonic design than the active architectures require, and with lower power consumption, because fewer electronic devices are needed to control the optics.

Our passive FND can feasibly be integrated into an electronic-photonic platform that would be useful for applications including, e.g., coherent high-speed optical communication.

Accordingly, the present disclosure relates to an apparatus in which an optical output of a tunable laser is connected to a Mach-Zehnder interferometer (MZI) having one arm that includes an optical resonator; a photodetector is optically coupled to an optical output of the MZI; and an electrical feedback control circuit is connected to receive electrical output signals from the photodetector and is configured to frequency-adjust the tunable laser based on the received electrical output signals. The MZI may, for example, be connected so as to receive an unmodulated optical output of the tunable laser. The photodetector may be optically coupled to the optical output of the MZI to produce a signal that frequency discriminates light received by the MZI in an operative laser wavelength range.

In embodiments, the photodetector is optically coupled solely to the optical output of the MZI to produce the frequency-discriminating signal.

In embodiments, the photodetector is a differential photodetector optically coupled to output ends of two respective arms of the MZI.

In embodiments, the MZI and photodetector form an optical frequency discriminator OFD. The OFD may, for example, be configured to indicate an offset between an optical frequency reference and a center frequency of light from the tunable laser. By "center frequency" is meant the central oscillation frequency of the laser, and not a sideband frequency produced, e.g., by modulation. The optical frequency reference may be, for example, the resonance frequency of the optical resonator connected to one arm of the MZI.

In embodiments, the MZI and photodetector form an optical frequency discriminator configured to produce, from the photodetector, a baseband signal indicative of an offset between the optical frequency reference and the center frequency of light from the tunable laser.

In embodiments, the optical resonator is an optical ring resonator optically coupled to a waveguide of the MZI arm. The coupling may be substantially critical coupling. In embodiments, precisely one optical ring resonator is optical coupled to the waveguide of the MZI arm. In alternate embodiments, the optical resonator may be, e.g., a Fabry-Perot interferometer or an etalon.

In embodiments, the optical resonator is an optical ring resonator having a Q-factor of at least 10000. In more specific embodiments, the Q-factor is at least 100,000.

In embodiments, the electronic feedback control circuit is connected to operate a frequency tuning port of the tunable laser.

In embodiments, the MZI and the electronic feedback control circuit are monolithically integrated on one chip. In embodiments, the MZI and the photodetector are monolithically integrated on one chip.

In embodiments, the laser, the MZI, and the photodetector are hybrid integrated on one substrate. In embodiments, the laser, the MZI, and the photodetector, and the electronic feedback control circuit are hybrid integrated on one substrate.

In embodiments, the optical resonator is an optical ring resonator having a Q-factor of at least 10,000 included in a first arm of the MZI, an optical delay line is included in the first MZI arm, and a thermal phase shifter is included in a second arm of the MZI that is distinct from the first MZI arm.

BRIEF DESCRIPTION OF THE DRAWINGS

FIG. 8 shows the central portion of FIG. 7 at magnified scale.

In FIG. 10, the error signal from the composite MZI of FIG. 9 is compared with the error signals from, respectively, a true-time delay MZI and a ring-coupled MZI.

DETAILED DESCRIPTION

Figure 1:
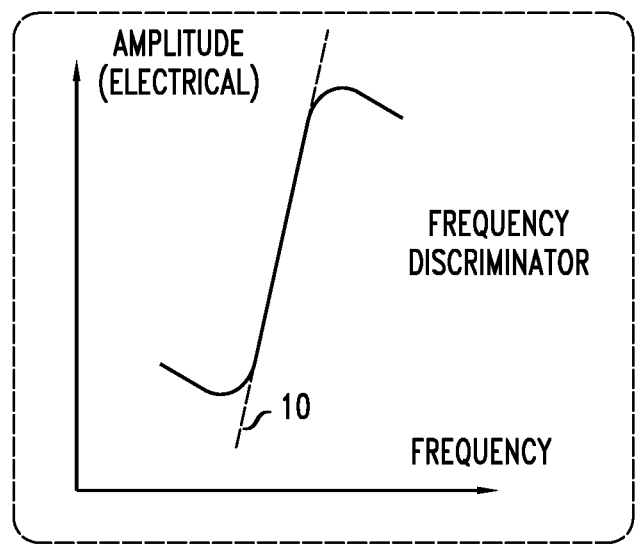
FIG. 1 is an idealized graph of the electrical amplitude response of a typical optical frequency discriminator.

FIG. 1 is an idealized graph, presented here for pedagogical purposes only, of the electrical amplitude response of a typical optical frequency discriminator. As shown in the figure, there is a frequency range over which the response increases for increasing frequency and decreases for decreasing frequency. In examples such as the one illustrated, the response may be approximately linear over a limited frequency range.

The performance of a frequency discriminator can be quantified in terms of its sensitivity to frequency fluctuations. This sensitivity is manifested in the slope 10 of the current-frequency curve. This slope, which we refer to as the frequency-discrimination gain, thus provides a measure of the electrical response per unit of frequency difference from a designated frequency reference point.

Figure 2:
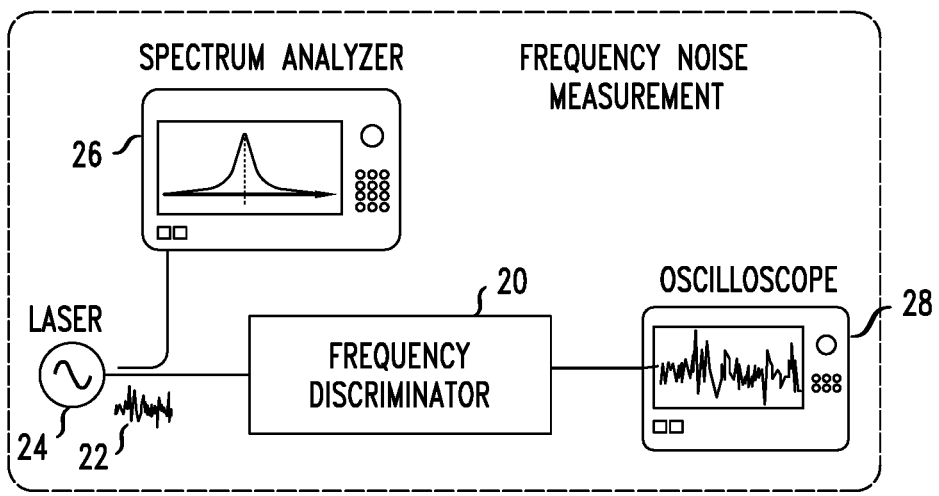
FIG. 2 is a block diagram illustrating how a frequency discriminator can be used to measure laser frequency noise.

FIG. 2 is a block diagram illustrating how a frequency discriminator 20 can be used to measure laser frequency noise 22. The output of laser 24 may be subject to frequency fluctuations that translate into a non-zero spectral linewidth, as represented in the figure by the display on a spectrum analyzer 26. The frequency fluctuations are converted to a time-varying voltage signal, as represented in the figure by an oscilloscope display 28. The frequency noise may be thought of as FM modulation of the laser output, and the frequency discriminator may be thought of as an FM demodulator.

Figure 3:
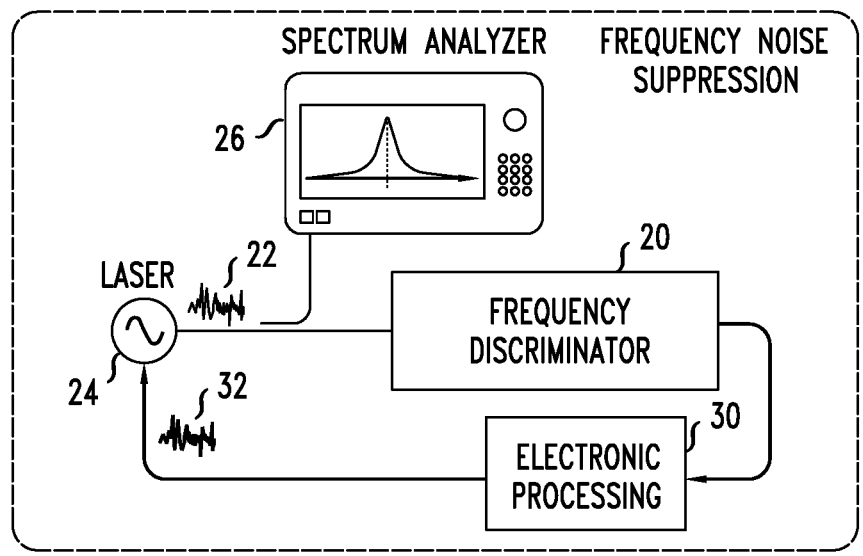
FIG. 3 is a block diagram illustrating how a laser can be stabilized by incorporating a frequency discriminator in a feedback loop.

FIG. 3 is a block diagram illustrating how the laser 24 can be stabilized by incorporating the frequency discriminator 20 in a feedback loop. In FIG. 3, the frequency discriminator 20 is represented generically.

The frequency discriminator 20 receives an incoming electric field oscillating at the optical frequency ($\omega_0$), compares its frequency fluctuations with a frequency reference ($\omega_{ref}$), and generates a proportional electronic signal that may be conditioned in the electrical domain by circuitry 30 to produce the error signal 32. The error signal can be used to either characterize the frequency noise of a laser or to stabilize its frequency when used in a feedback control loop. When used in a feedback control loop, the error signal is fed to the tuning-control input of the laser to compensate for the measured difference from the reference frequency.

It should be noted that any electronically tunable laser would be suitable for the arrangement of FIG. 3. Non-limiting examples include DFB lasers and external cavity lasers. Lasers such as these are of particular interest because they can feasibly be hybrid integrated with an electro-optic control system.

Figure 4:
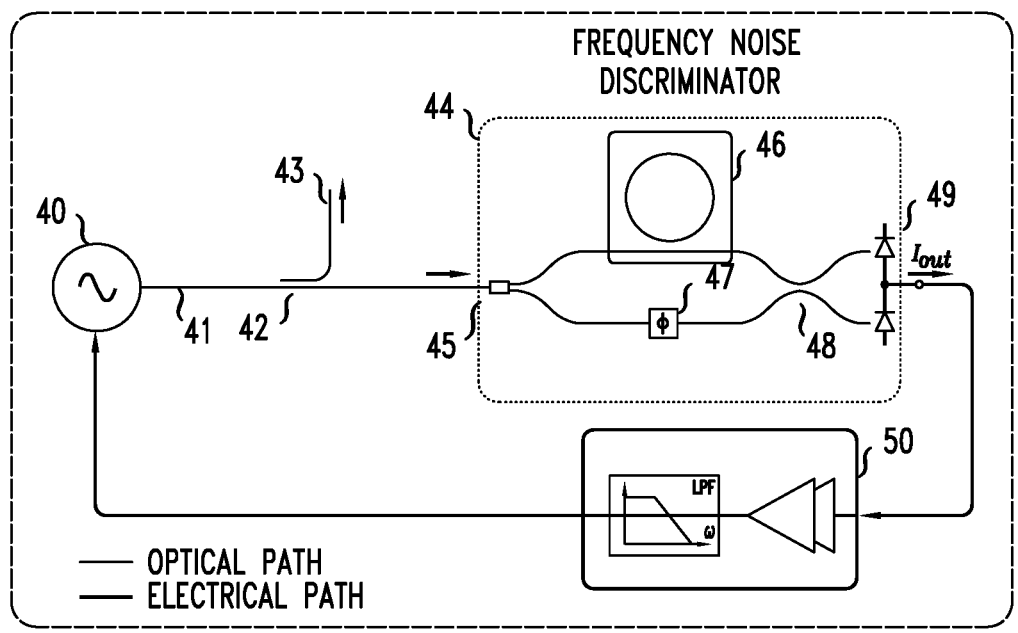
FIG. 4 is a simplified block diagram illustrating a feedback control loop for laser stabilization that includes an FND according to principles described here.

FIG. 4 is a simplified block diagram illustrating a feedback control loop for laser stabilization that includes an FND according to our new approach. In the example of FIG. 4, the FND is a cavity-coupled MZI. The architecture illustrated in FIG. 4 may be implemented on an integrated platform, or it may be expanded to a benchtop-scale platform.

Turning to the figure, it will be seen that a voltage/current tunable laser 40 is controlled by the feedback loop. The laser output is coupled into waveguide 41, which is integrated on, e.g., an electronic-photonic chip. The optical signal is passed through tunable coupler 42, from which a portion 43 of the signal is diverted out of the chip, exemplarily for monitoring, and the rest of the optical signal is coupled forward. As those skilled in the art will recognize, the optical output under closed-loop operation will contain an electric field that oscillates at the optical frequency of the input laser, with a suppressed content of frequency noise.

The forward-coupled optical signal is injected into FND 44, which, as noted, is constituted by an MZI having two branches that, for easy reference to the figure, are referred to here as "upper" and "lower" branches.

At the MZI input, the incoming light is split into two equal parts by power splitter 45, which will typically be a broadband Y-junction. In the upper branch, an optical frequency reference 46 filters the amplitude and phase of the light at its output end, relative to its input end. In the example of FIG. 4, the optical frequency reference is a high-quality factor (i.e., high Q-factor) integrated ring resonator. In other examples, as discussed below, the optical frequency reference could be a different type of passive optical resonator such as a Fabry-Perot interferometer or an etalon.

In the lower branch, optical phase shifter 47 adjusts the phase of the optical signal to compensate for random excess phase shift that may be present due to fabrication-induced error. It can also compensate for random thermal fluctuation, and it can be used to adjust the phase difference between the MZI arms to the proper value for optimum functionality.

Optical phase shifter 47 does not need to be a fast device. Conventional bandwidths for optical phase shifters will be sufficient. These bandwidths are typically in the range of tens to hundreds of kilohertz, which is well below the frequencies used for radiofrequency modulation.

The outputs of the upper and lower arms are combined and interfered with each other using an element such as balanced 2×2 directional coupler 48. The combined output is photodetected using a differential photodetector, represented here by balanced pair 49 of photodiodes. The electrical current $I_{out}$ at the output of the balanced photodiodes is the subtractive difference between the respective currents from the two individual diodes of the photodetector pair.

In the example of FIG. 4, the photodetector 49 is optically coupled solely to the MZI output.

The output current $I_{out}$ is injected into electronic processing unit 50, which contains amplifiers and filters according to known teachings in the art. Typically, the differential photodetector is followed by a transimpedance amplifier (TIA), which converts the output current $I_{out}$ to a voltage signal. For simplicity, we assume here that the TIA is included in electronic processing unit 50. However, we do not exclude the possibility that the TIA may be disposed separately from unit 50. The processed error signal from unit 50 is injected into the control port of the laser to adjust its frequency and suppress the random frequency fluctuations.

Figure 5:
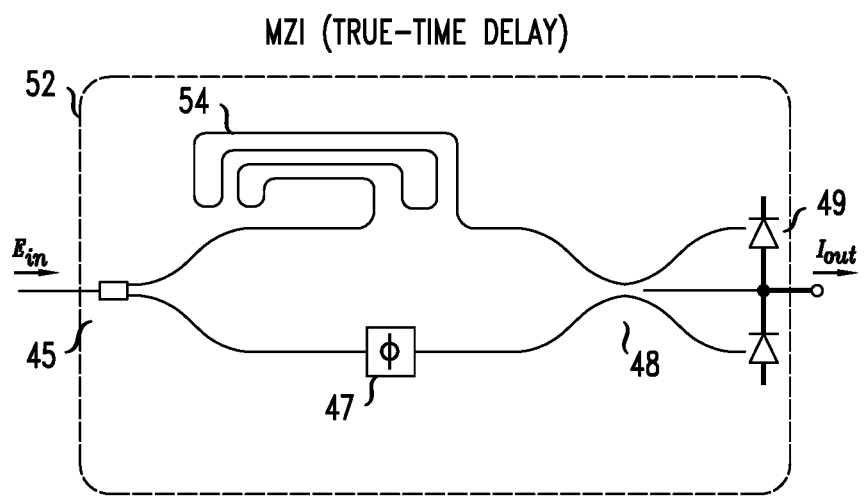
FIG. 5 is a simplified block diagram illustrating a second example of a feedback control loop for laser stabilization that includes an FND. In the example of FIG. 5, the FND is a simple delay line arranged as a true-time delay, instead of the coupled ring resonator of FIG. 4.

In the example of FIG. 4, the output current $I_{out}$ from the photodetector, as well as the resulting voltage signal, each constitute a baseband signal indicative of an offset between an optical frequency reference due to the ring resonator and a center frequency of light from the tunable laser FIG. 5 is a simplified block diagram illustrating, for comparison, an example of a feedback control loop for laser stabilization in which the FND 52 includes a simple delay line 54 arranged as a true-time delay, instead of the coupled ring resonator of FIG. 4. In comparing FIGS. 4 and 5, it should be noted that corresponding figure elements are called out by like reference numerals.

In the arrangements of FIG. 4 and FIG. 5, the error signal ($I_{out}$) at the output of the differential photodetector can be written as $$I_{out}(\omega) = RP_0|T(\omega)|\sin(\angle T(\omega) - \phi), \tag{1}$$

where $R, P_0, |T(\omega)|, \angle T(\omega), \omega$, and $\phi$ are photodetector responsivity, laser power, amplitude, and phase of the reference transfer function, laser instantaneous frequency, and the static bias phase on the other arm of the MZI, respectively.

It will be understood from the above discussion that the frequency reference may be a high quality-factor (Q-factor) ring resonator or a low loss waveguide, and that the error signal ($I_{out}$) can be calculated numerically using Eq. (1).

Figure 6:
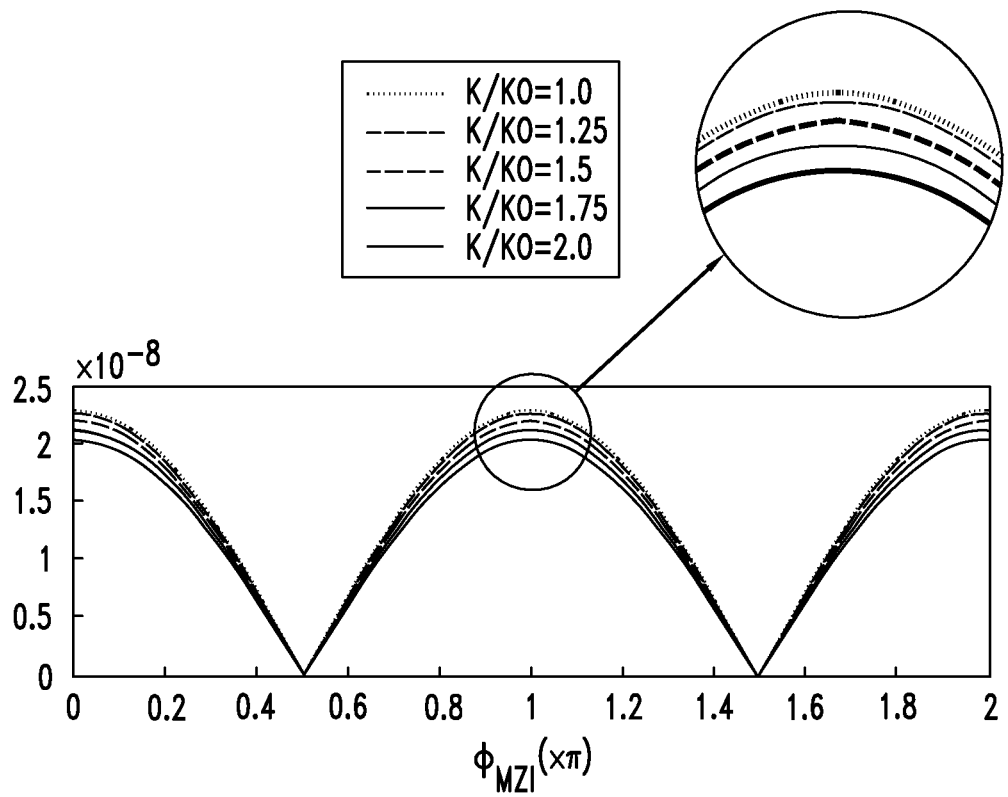
FIG. 6 is a graph generated from numerical simulations to illustrate how the gain of a frequency noise discriminator depends on the relative phase between MZI arms, in different scenarios.

FIG. 6 is a graph generated from numerical simulations to illustrate how the gain of a frequency noise discriminator depends on the relative phase between MZI arms. Results are plotted for five different ring-coupling values. From the top curve down, the ring-coupling values, normalized to the critical coupling value, are 1.0, 1.25, 1.5, 1.75, and 2.0.

The graph in FIG. 6 illustrates the importance of adjusting the phase difference between the MZI arms for optimum gain. In the case of a delay line, as in FIG. 5, the phase difference between the arms of the MZI needs to be adjusted not only to compensate for manufacturing errors, but also to tune the zero-crossing of the MZI as seen in FIG. 6, below. This places the frequency reference at the desired point.

Figure 7:
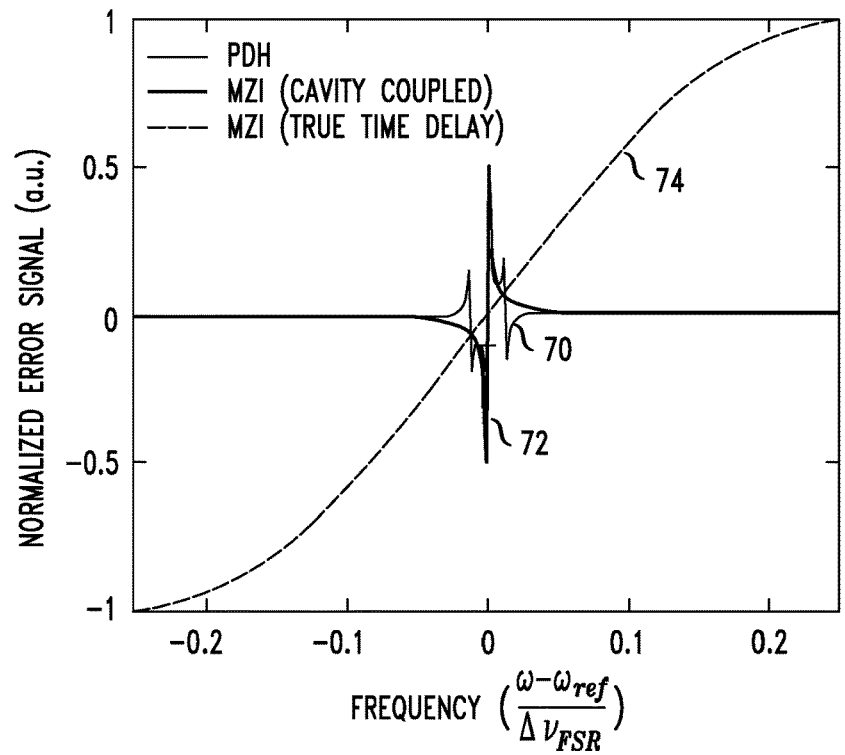
FIGS. 7 and 8 compare the error signals generated by three different schemes for frequency discrimination. Both figures are graphs of an error signal as a function of laser frequency offset from a reference frequency. The graphs were generated from a simulation.
Figure 8:
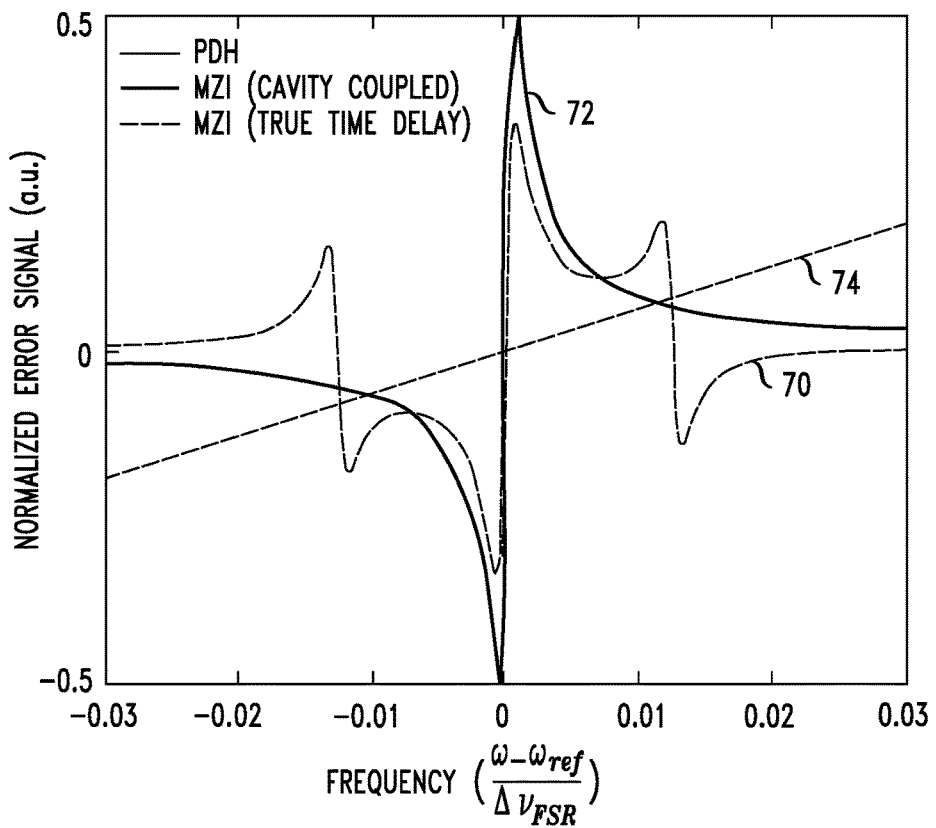

FIGS. 7 and 8 compare the error signals generated by three different schemes for frequency discrimination. Both figures are graphs of the error signal as a function of laser frequency offset from a reference frequency. The graphs were generated from a simulation. FIG. 8 shows the central portion of FIG. 7 at magnified scale.

In each of FIGS. 7 and 8, three plots can be seen. The plots, are labeled "PDH", "MZI (cavity coupled)", and "MZI (true time delay)", corresponding respectively to reference numerals 70, 72, and 74.

The PDH plots represent a simulation of the technique described in in R. W. P. Drever et al (1983), which was cited above. The Drever et al. technique uses an active FND in a feedback control loop for stabilizing a laser. An electrical local oscillator (LO) phase modulates the incoming optical-frequency electric field from the laser. The modulated light is filtered using an optical frequency reference and then it is converted to an electrical signal using a photodetector. The electrical output signal from the photodetector is amplified, a mixer down-converts the electrical output signal using the same LO frequency used for modulation, and then the electrical output signal is low-pass filtered to provide the error signal.

The plot labeled "MZI (cavity coupled)" is the result of a simulation of the circuit of FIG. 4, and the plot labeled "MZI (true time delay)" is the result of a simulation of the circuit of FIG. 5. The simulations assumed that the length of the delay line in the "MZI (true time delay)" design was equal to the circumference of the ring resonators used in the PDH design and the "MZI (cavity coupled)" design, so that the free spectral range (FSR) was the same for all three cases.

With further reference to FIGS. 7 and 8, it should be noted that the frequency offset, as plotted on the horizontal axes of the figures, is normalized to the FSR. It will be apparent upon inspection of these figures that all three schemes offer an asymmetric error signal response around the optical reference frequency. However, it will also be apparent that for a given FSR, the gain for discrimination of frequency noise is significantly higher for the PDH and cavity-coupled MZI designs than for the true-time-delay MZI design. This higher response is due to the resonant behavior exhibited by the rings, but not by the true-time delay.

It is noteworthy in this regard that the response of the true-time-delay MZI design is seen to be approximately linear over a frequency range of about ±10% of the free spectral range. The slope of this quasilinear response curve is proportional to the length of the true time delay. Thus, there is a tradeoff between sensitivity and usage of chip area for the layout of the waveguide that implements the time delay.

In the numerical calculations for FIGS. 7 and 8, the waveguide loss was assumed to be 0.2 dB/cm. The ring circumferences in the case of PDH loop and the cavity-coupled MZI were identical. The Q-factor for the ring resonator was about 1.6 million at the resonance wavelength of 1550 nm. The local oscillator frequency in the PDH architecture was 1 GHz, and the optical and electrical phase shifters were optimized accordingly.

Reference to FIGS. 7 and 8 shows that, given the same waveguide length and electronics gain, the PDH and the cavity-coupled MZI have significantly greater frequency discrimination gain, relative to the true-time delay MZI. Specifically, the gain for PDH, MZI with true-time delay, and cavity-coupled MZI were $1.14 \times 10^{-8}$ $Hz^{-1}$, $8 \times 10^{-11}$ $Hz^{-1}$, and $1.7 \times 10^{-8}$ $Hz^{-1}$, respectively.

In general, the higher the Q-factor of the ring, the higher the noise discrimination sensitivity. Thanks to the resonance effect in the cavity-coupled MZI, the frequency discrimination sensitivity is more than two orders of magnitude higher than it would be in a conventional MZI. However, unlike the PDH architecture, the cavity-coupled MZI requires no phase modulation and it has simpler requirements for electronic circuitry.

Moreover, because neither the cavity-coupled MZI nor the true-time delay MZI involve phase modulation, they are free from residual amplitude noise that a phase modulator could otherwise produce. Reducing the number of electronic and photonic components also beneficially reduces power consumption and consumption of chip area.

Figure 9:
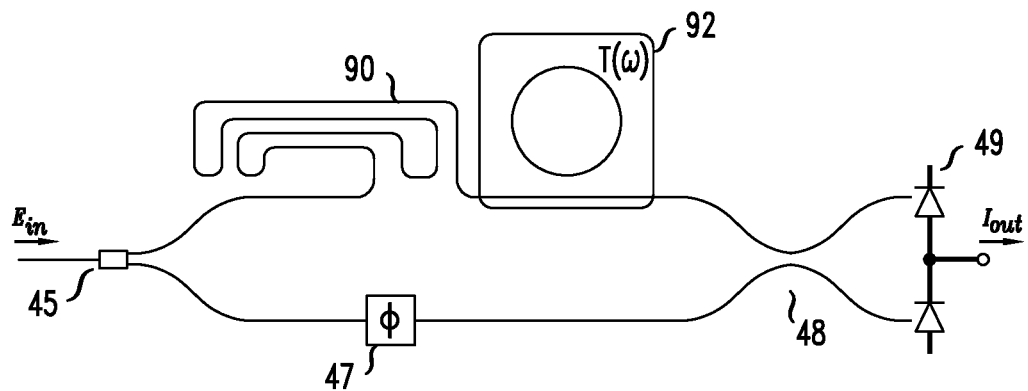
FIG. 9 is a simplified block diagram illustrating an example of a feedback control loop for laser stabilization in which the MZI includes both a true-time delay and a coupled ring resonator.

FIG. 9 is a simplified block diagram illustrating an example of a feedback control loop for laser stabilization in which the MZI includes both a true-time delay 90 and a coupled ring resonator 92. The combination of a true-time delay and a ring resonator could beneficially extend the locking range and could facilitate automated acquisition of the desired locking point. In an example scenario, the true-time delay provides a non-zero asymmetric response under far off-resonance conditions when the coupled ring is non-responsive. The electronic control (not shown) is configured to amplify the error signal with high gain in this regime, and to push the laser tuning toward the locking point. Nearer to ring resonance, the electronic control is switched to a lower-power operating mode that keeps the laser locked to the ring resonance. The transition between the two operating regimes can be detected by monitoring a small portion of the optical power that is tapped off from the output port of the ring resonator.

Figure 10:
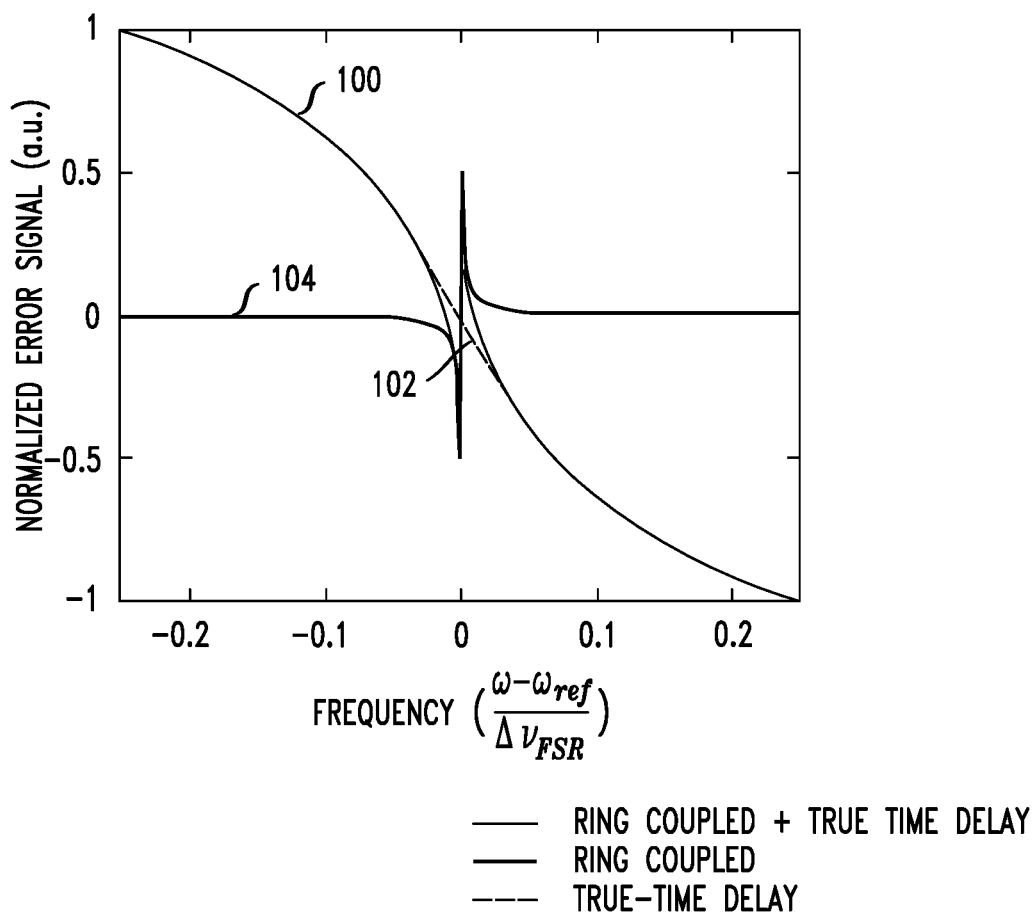
FIG. 10 is a graph that, like, FIG. 7, shows the error signal as a function of laser frequency offset from a reference frequency.

FIG. 10 is a graph that, like, FIG. 7, shows the error signal as a function of laser frequency offset from a reference frequency. In FIG. 10, the error signal 100 from the composite MZI of FIG. 9 is compared with the error signals from, respectively, a true-time delay MZI (curve 102) and a ring-coupled MZI (curve 104). The operating regimes far from resonance and near resonance are visible in the figure.

For many applications, it would be advantageous to fabricate the FND using known integration processes. For example, the passive optical components could be implemented with a CMOS silicon-on-insulator (SOI) process or with a low-loss silicon nitride (SiN) process. A SiN process is especially beneficial if there is a need for low-loss, high-quality optics.

Further, the active laser medium could be hybrid integrated on a common substrate with the passive optics. Still further, a CMOS-SOI process would make it possible to integrate electronics components, including the components for conditioning the error signal, onto the same platform as the passive optical components.

Example waveguide materials for the MZI include, without limitation, silicon (Si) and silicon nitride (SiN). Silicon is a beneficial choice because it would make it possible to fully integrate the passive optics with the control electronics. On the other hand, SiN can potentially offer waveguides with lower loss and lower thermorefractive noise than Si, thus reducing the achievable threshold for laser-frequency noise.

It is also noteworthy in this regard that with a higher-index waveguide material such as silicon, the MZI will have a smaller footprint. Because this helps to reduce temperature gradients across the FND, it helps to stabilize the FND against random temperature fluctuations.

It should be noted that to compensate for fabrication-induced errors in the cavity-coupled MZI design, it will generally be desirable to include a thermal phase adjuster in the ring resonator. Such a phase adjuster would also be useful to adjust and fine tune the resonance frequency of the ring.

In designs that include a delay line in the upper branch of the MZI for true-time delay, a thermal phase adjuster in the lower branch of the MZI would provide sufficient tuning control of the resulting relative phase delay. As noted above, the gain for frequency discrimination by a true-time delay MZI is roughly proportional to the length of the delay line. The smallest acceptable delay is determined by the signal-to-noise ratio (SNR) at the input of the electronic circuitry for conditioning the error signal. To compensate for a smaller signal, larger electronic gain is required to achieve a given level of noise reduction. Higher gain comes at the cost of higher power consumption, electronic bandwidth, and noise.

If the delay becomes too large, on the other hand, optical propagation loss can become a limiting factor, because the loss increases exponentially with the length of the delay line.

Figure 11:
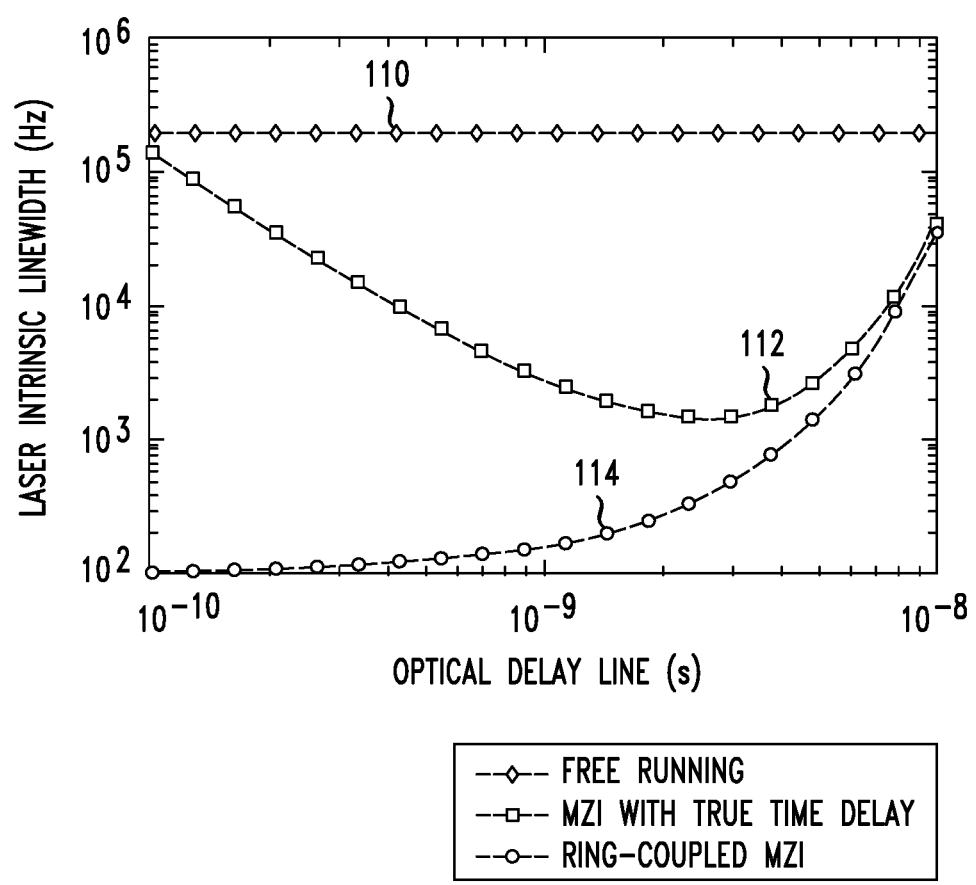
FIG. 11 is a graph of the results of a simulation, showing an example of how laser linewidth varies as the length of the delay line is varied.

FIG. 11 is a graph showing how laser linewidth varies as the length of the delay line is varied. To generate the graph, we performed simulations to predict the linewidth of a free-running laser (curve 110), a laser locked using a MZI with true-time delay (curve 112), and a laser locked using a ring-coupled MZI (curve 114). In the graph, optical delay in units of seconds is plotted on the horizontal axis. In the simulations, the length of the delay line was equal to the circumference of the ring resonator, so that the delay line and the ring resonator had the same ratio of delay to FSR.

The parameters that were assumed in the simulation on which FIG. 11 is based are listed below. The transimpedance amplifier was the electronic component immediately following the differential photodetector.

Laser power coupled to the FND: about 1.5 mW
Laser initial linewidth: 200 kHz
Waveguide loss: 0.15 dB/cm
Laser FM gain: 0.35 GHz/mA
Voltage-to-Current Conversion Factor: 10 mA/V
Laser FM bandwidth: 1 MHz
Transimpedance amplifier (TIA) gain: 5 KW
TIA input referred noise: 3.2 pA/Hz$^{1/2}$.

Turning to the plot for the MZI with true-time delay in FIG. 11, it will be seen that for a given waveguide loss, there is an optimal delay value where the laser linewidth reaches a minimum. In the case of the ring-coupled MZI, the increase in propagation loss as the delay length increases causes the Q-factor of the ring to decrease, which in turn decreases the performance of the feedback loop.

Theoretically, the need for coherent interference between the arms of the MZI imposes another limit on the acceptable length of the delay line. To ensure coherent interference at the output combination port of the MZI, the delay difference between the arms of the MZI would need to be no more than 1/C, where C is the Lorentzian spectral linewidth of the laser. For commercially available telecommunication lasers, this linewidth is generally less than and on the order of 1 MHz. Hence, the delay difference should be no more than a few microseconds. As such a large delay difference is impractical for implementation on a chip, however, the dominant limitation on delay will generally be due to loss rather than to laser coherence time.

As noted above, decreasing the Q-factor of the ring resonator in the ring-coupled MZI will decrease the performance of the feedback loop. Or in other words, the higher the Q-factor, the better the performance. As also noted above, loss tends to decrease the Q-factor or, in other words, reducing the loss tends to increase the Q-factor, and hence, to improve the performance.

Although lower values could still be useful for at least some purposes, it would be desirable for practical applications to have a Q-factor of 10,000 or more, and preferably of 100,000 or more.

A first step in maximizing the Q-factor is to choose a low-loss platform. However, the main source of loss in integrated optical waveguides is usually the scattering loss due to side-wall roughness. For this reason, it may be advantageous to use a multimode waveguide instead of a single-mode waveguide for the ring resonator. That is, the optical mode in a wide multimode waveguide will interact more weakly with the waveguide sidewalls than in a single-mode waveguide, resulting in significantly lower scattering loss. When designing with such a wide waveguide, however, it is desirable to implement the bends in the waveguide in such a way that excitation of the higher-order modes is avoided.

In the ring-coupled MZI, it is preferable for the coupling between the ring resonator and the upper arm of the MZI to be critical coupling, i.e., coupling such that the optical loss in the ring is equal to the energy coupled to the ring. The FND can be designed to be critically coupled. The two main parameters that can be controlled to engineer the coupling between the MZI and the ring resonator are the gap between the MZI upper arm and the length of the coupling region.

A critically coupled ring resonator will give the maximum FND gain. In general, however, the gain will be close enough to the maximum to still be advantageous if the resonator coupling is within 25% of critical. Accordingly, we define "substantially critical coupling" as coupling that is within 25% of critical.

One way to detect whether the coupling is critical is to monitor the attenuation in the ring while sweeping the laser frequency. With critical coupling, very large attenuation is seen at the resonance frequency. Another detection method is to fix the laser at the resonance frequency of the ring and to observe the output current from the photodetector while varying the current in the thermal phase shifter. With critical coupling, the output current from the photodetector is insensitive to the resulting changes in phase.

For implementations on a photonic integrated circuit (PIC) chip, the components of the FND will typically be fabricated on the device layer of the chip. According to well-known practices, these components will typically be optimized for a specified polarization, i.e., for TM or for EM polarization. The chosen polarization would be preserved in the system to ensure that the optical signals in the respective arms of the MZI interfere properly.

The FND components can be designed to support higher-order optical modes. However, only a single mode should propagate throughout the system.

As noted above, the control electronics (amplifiers, laser drivers, etc.) can be integrated on the same CMOS-SOI chip with the passive optics. These control electronics could include, e.g., amplifiers, laser drivers, and the like. In alternative implementations, a CMOS chip containing all the control electronics could be hybrid integrated with the photonics chip containing the passive optical components. Such hybrid integration may be desirable, for example, when integrated processes such as ultra-low-loss SiN or silica are used to make dedicated photonics chips. In still other implementations, some or all of the control electronics could be implemented off-chip, exemplarily on a printed circuit board (PCB).

Several methods are available for integration of photodetectors. For example, germanium (Ge) photodetectors can be monolithically integrated in silicon photonics platforms. Although monolithic integration of photodetectors is not currently feasible in SiN processes, photodiode chips can be added to a photonic chip by hybrid integration. For example, a photodiode can be packaged on top of a CMOS chip by known processes.

Example

Figure 12:
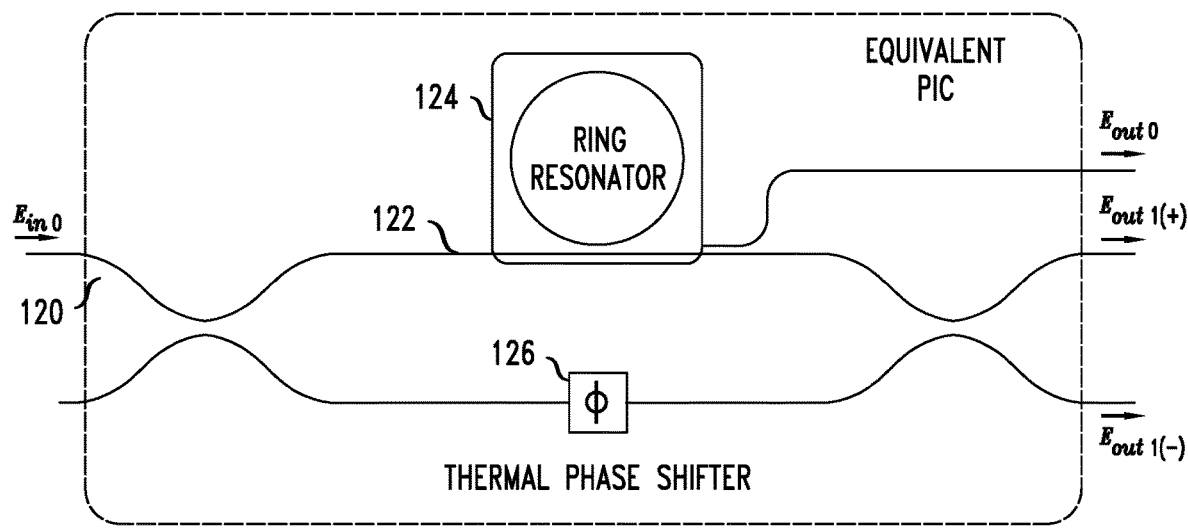
FIG. 12 shows the equivalent schematic for a photonic circuit, according to principles described here, that was used in an experimental demonstration.

We performed an experimental demonstration of a cavity-coupled MZI frequency noise discriminator by implementing the FND as a PIC on a general-purpose, programmable photonics platform. FIG. 12 shows the equivalent schematic for the photonic circuit. As shown in the figure, the input light ($E_{in}$) is coupled to an input waveguide 120 to MZI 122. The output $E_{out0}$ of ring resonator 124 and the MZI outputs $E_{out1(+)}$, $E_{out1(-)}$ are coupled out using optical fibers. The phase of the MZI is adjusted using one or more thermal phase shifters 126.

Figure 13:
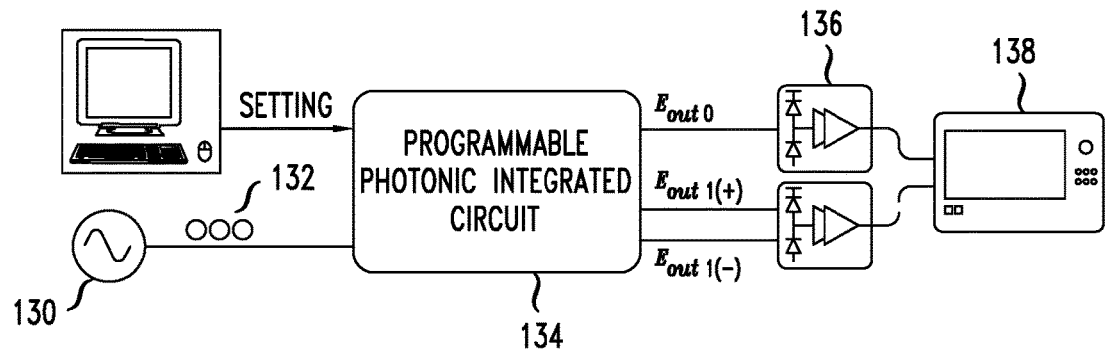
FIG. 13 is a block diagram of the measurement setup for experimental demonstration of the circuit of FIG. 12.

FIG. 13 is a block diagram of the measurement setup. A tuneable 10-mW continuous wave laser 130 with polarization controller 132 is coupled into the programmable PIC 134. The laser wavelength is swept from 1549 nm to 1551 nm with 1-pm resolution. The output electric fields, $E_{out1(+)}$, $E_{out1(-)}$, and $E_{out0}$ are photo-detected using commercially available photodetectors 136, and they are monitored on an oscilloscope 138.

Figure 14:
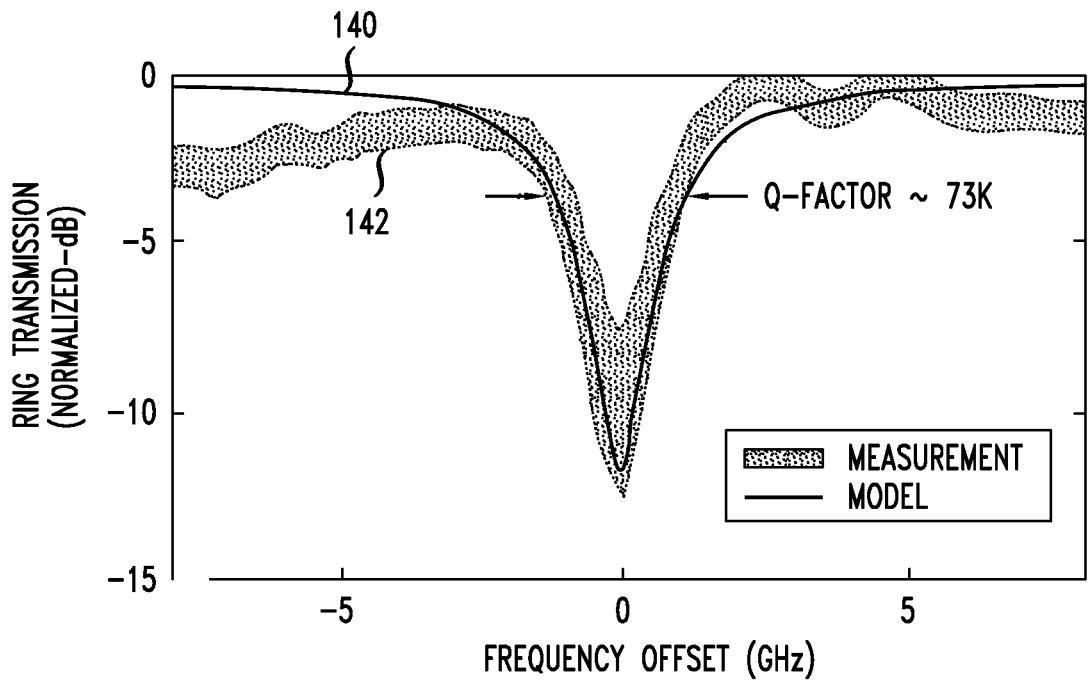
FIG. 14 shows the normalized resonance response of a ring resonator coupled to a MZI, as measured in the experimental demonstration of the circuit of FIG. 12.

FIG. 14 shows the normalized resonance response of the ring resonator coupled to the MZI. The response as predicted by numerical modeling is shown as curve 140, and the measured response is shown as curve 142. The measured ring resonator Q-factor is about 73,000, and the extinction ratio is about 12 dB. The ring FSR is about 15 GHz.

Figure 15:
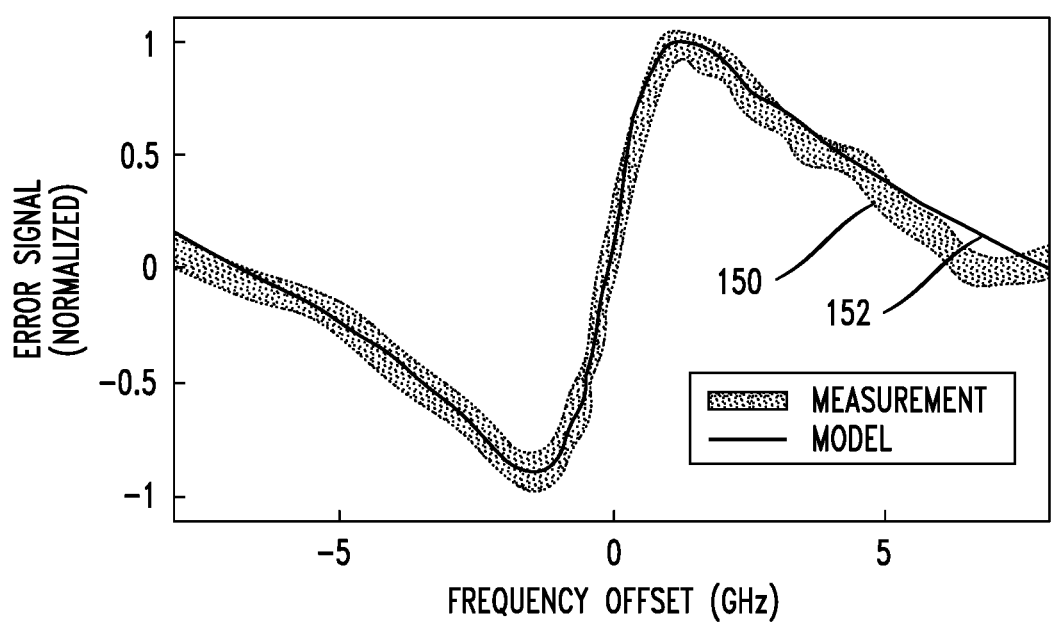
FIG. 15 shows an error signal, as measured in the experimental demonstration of the circuit of FIG. 12.

FIG. 15 shows the measured error signal 150 which, as shown in the figure, agrees well with curve 152, predicted from the mathematical model. As shown, the error signal is asymmetric around the reference ring resonance frequency. The normalized frequency noise discriminator gain is about $10^{-9}$ $Hz^{-1}$.

What is claimed is:

1. Apparatus, comprising:
   a tunable laser;
   a Mach-Zehnder interferometer (MZI) connected to an optical output of the tunable laser;
   a differential photodetector optically coupled to an optical output of the MZI; and
   an electrical feedback control circuit connected to receive electrical output signals from the differential photodetector and configured to frequency-adjust the tunable laser based on the received electrical output signals; wherein
   the MZI has two arms;
   the MZI comprises an output combination port optically coupled to the two MZI arms and configured to combine respective outputs of the two arms and to interfere said outputs with each other, thereby to form the optical output of the MZI;
   the differential photodetector comprises a balanced pair of photodiodes, each of which is arranged to receive a respective portion of the optical output of the MZI; and
   one arm of the MZI includes an optical resonator.

2. The apparatus of claim 1, wherein the MZI is connected so as to receive an unmodulated optical output of the tunable laser.

3. The apparatus of claim 1, wherein the differential photodetector is optically coupled to the optical output of the MZI to produce a signal that frequency discriminates light received by the MZI in an operative laser wavelength range.

4. The apparatus of claim 1, wherein the differential photodetector is optically coupled solely to the optical output of the MZI to produce a signal that frequency discriminates light received by the MZI in an operative laser wavelength range.

5. The apparatus of claim 1, wherein the MZI and differential photodetector form an optical frequency discriminator.

6. The apparatus of claim 1, wherein the MZI and differential photodetector form an optical frequency discriminator configured to indicate an offset between an optical frequency reference and a center frequency of light from the tunable laser.

7. The apparatus of claim 6, wherein the optical frequency reference is a resonance frequency of the optical resonator.

8. The apparatus of claim 1, wherein the MZI and differential photodetector form an optical frequency discriminator configured to produce, from the differential photodetector, a baseband signal indicative of an offset between an optical frequency reference and a center frequency of light from the tunable laser.

9. The apparatus of claim 1, wherein the optical resonator comprises at least one element selected from the group consisting of an optical ring resonator, a Fabry-Perot interferometer, and an etalon.

10. The apparatus of claim 1, wherein the optical resonator comprises an optical ring resonator optically coupled to a waveguide of the said MZI arm.

11. The apparatus of claim 10, wherein precisely one optical ring resonator is optically coupled to the waveguide of the said MZI arm.

12. The apparatus of claim 10, wherein the optical ring resonator is substantially critically coupled to the waveguide of the said MZI arm.

13. The apparatus of claim 10, wherein the optical ring resonator has a Q-factor of at least 10000.

14. The apparatus of claim 10, wherein the optical ring resonator has a Q-factor of at least 100,000.

15. The apparatus of claim 1, wherein the electronic feedback control circuit is connected to operate a frequency tuning port of the tunable laser.

16. The apparatus of claim 1, wherein the MZI and the electronic feedback control circuit are monolithically integrated on one chip.

17. The apparatus of claim 1, wherein the MZI and the differential photodetector are monolithically integrated on one chip.

18. The apparatus of claim 1, wherein the laser, the MZI, and the differential photodetector are hybrid integrated on one substrate.

19. The apparatus of claim 1, wherein the laser, the MZI, and the differential photodetector, and the electronic feedback control circuit are hybrid integrated on one substrate.

20. The apparatus of claim 1, wherein:
   the optical resonator included in one arm of the MZI is included in a first arm of the MZI;
   the said optical resonator included in the first MZI arm is an optical ring resonator having a Q-factor of at least 10,000; and
   the first MZI arm further includes an optical delay line;
   the MZI has a second arm distinct from the first MZI arm; and
   the second MZI arm includes a thermal phase shifter.

* * * * *